US005873024A

United States Patent [19]

Suzuki

[11] Patent Number: 5,873,024

[45] Date of Patent: Feb. 16, 1999

[54] RADIO SELECTIVE CALLING RECEIVER

[75] Inventor: Masaki Suzuki, Shizuoka, Japan

[73] Assignee: NEC Corporation, Tokyo, Japan

[21] Appl. No.: 767,217

[22] Filed: Dec. 16, 1996

[30] Foreign Application Priority Data

Dec. 25, 1995 [JP] Japan .................................... 7-337528

[51] Int. Cl.$^{6}$ ........................................................ H04Q 3/02

[52] U.S. Cl. .................... 455/38.2; 455/38.3; 340/407.1; 340/825.44; 340/825.46

[58] Field of Search .................................. 455/38.1, 38.2, 455/38.3, 38.4, 343, 574, 38.5; 340/825.44, 407.1, 407.2, 825.46; 434/112, 114, 116

[56] References Cited

U.S. PATENT DOCUMENTS 4,581,491 4/1986 Boothroyd .............................. 434/114
4,918,438 4/1990 Yamasaki ........................... 348/825.46
5,588,839 12/1996 Shimoda ................................. 434/114
5,726,642 3/1998 Kudoh et al. ...................... 340/825.44

FOREIGN PATENT DOCUMENTS 5-244061 9/1993 Japan .

*Primary Examiner*—Wellington Chin
*Assistant Examiner*—Lee Nguyen
*Attorney, Agent, or Firm*—Scully, Scott, Murphy and Presser

[57] ABSTRACT

A radio selective calling receiver outputs a received message by speech through a loudspeaker upon reception of a radio selective call signal addressed to the receiver. The receiver includes a message length detection section, and a vibrator. When the radio selective call signal is received, the message length detection section detects the time length of a message signal which is included in the call signal and is to be output by speech. The vibrator vibrates the body of the radio selective calling receiver in accordance with an output signal from the message length detection section for the output time of the output signal.

4 Claims, 2 Drawing Sheets

RADIO SELECTIVE CALLING RECEIVER

BACKGROUND OF THE INVENTION

1. Field of the Invention

The present invention relates to a radio selective calling receiver and, more particularly, to a radio selective calling receiver which outputs a message corresponding to a received stereotyped expression by speech.

2. Description of the Prior Art

When a conventional radio selective calling receiver of this type receives a radio selective call signal addressed thereto, the receiver receives a message signal succeeding the call signal, restores it to a message, and outputs it by speech through a loudspeaker or by display through an LCD.

This received message signal is constituted by an abbreviated code representing a stereotyped expression, an illustration, or the like, and numerical information. On the transmission side, a code table or the like is prepared to edit a message, and a message signal corresponding to the message is transmitted through a telephone set such as a push-button phone. In some system, speech information is directly converted into a digital signal without using any stereotyped expression as a message signal, and the digital signal is transmitted. On the reception side, this signal is restored to analog speech information and output by speech.

When a message is output by speech in this manner, the power consumption undesirably increases. In a radio selective calling receiver of this type, in particular, miniaturization and weight reduction are important requirements from the user's point of view. It is therefore inevitable that the capacity of the built-in battery is small, and the power consumption must be reduced.

For this reason, in the receiver disclosed in Japanese Unexamined Patent Publication No. 5-244061, the presence/absence of speech information in a received message signal and the data amount of speech before the information is output by speech. A callee sees this display to suppress unnecessary speech output and reduce the power consumption.

In this prior art, a message signal is constituted by speech information obtained by converting speech into digital information, numerical information, and the like. If this signal includes no speech information, the user does not perform a speech output operation. Alternatively, if the data amount of speech is known, since the output time can be expected, a speech output less irritates the user. In some case, it suffices if the speech information is partly output. Therefore, a reduction in power consumption can be attained as well as an improvement in operability.

As described above, in the prior art, in order to reduce the power consumption, the presence/absence of speech information included in a message signal and the length of the information are displayed before the information is output by speech. If, however, the user of this receiver has a visual or auditory handicap or cannot see the display in a dark place, this function cannot produce any satisfactory effect.

Furthermore, in the prior art, as a means for detecting the presence/absence of speech information and its length, speech information is read out from a memory, and its data amount is measured. However, this means demands a complicated circuit.

SUMMARY OF THE INVENTION

The present invention has been made in consideration of the above situation in the prior art, and has as its object to provide a radio selective calling receiver which notifies a user of the time length of a message, even if he/she has a visual or auditory handicap, in accordance with the period of time during which the receiver body vibrates, before the received message is output by speech, and allows a partial output operation or prolongation of the service time of a battery using an external power supply or the like when a speech output lasts long.

In order to achieve the above object, according to the basic aspect of the present invention, there is provided a radio selective calling receiver for outputting a received message by speech through a loudspeaker upon reception of a radio selective call signal addressed to the receiver, comprising message length detection means for, when the radio selective call signal is received, detecting a time length of a message signal which is included in the call signal and is to be output by speech, and vibration generating means for vibrating a body of the radio selective calling receiver in accordance with an output signal from the message length detection means.

For example, the radio selective call signal uses a stereotyped code signal, which is an abbreviated code, as the message signal, the message length detection means detects a time length of the stereotyped code signal upon reception of the call signal, and the vibration means vibrates the body for a period of time corresponding to the detected time length.

In addition, this radio selective calling receiver may further comprise an external terminal to which an external power supply can be easily connected in parallel with a built-in power supply.

According to the radio selective calling receiver of the present invention, which has the arrangement based on the above aspect, the time length of a received message can be known from the period of time during which the body vibrates before the message is output by speech. For this reason, if the time length of a given message is long, the message may be partly output by speech or may be output by speech after an external power supply is connected to the external terminal, thereby prolonging the service life of the built-in battery. Since the body vibrates to notify the time length of a message, even a visually handicapped person can use the receiver. In addition, since the time length of a message is detected by using an existing power supply starting signal and a self-number identification signal, the required circuit can be simplified.

The above and many other advantages, features and additional objects of the present invention will become manifest to those versed in the art upon making reference to the following detailed description and accompanying drawings in which preferred embodiments incorporating the principles of the present invention are shown by way of illustrative example.

DETAILED DESCRIPTION OF THE PREFERRED EMBODIMENT

A preferred embodiment of the present invention will be described below with reference to the accompanying drawings.

Figure 1:
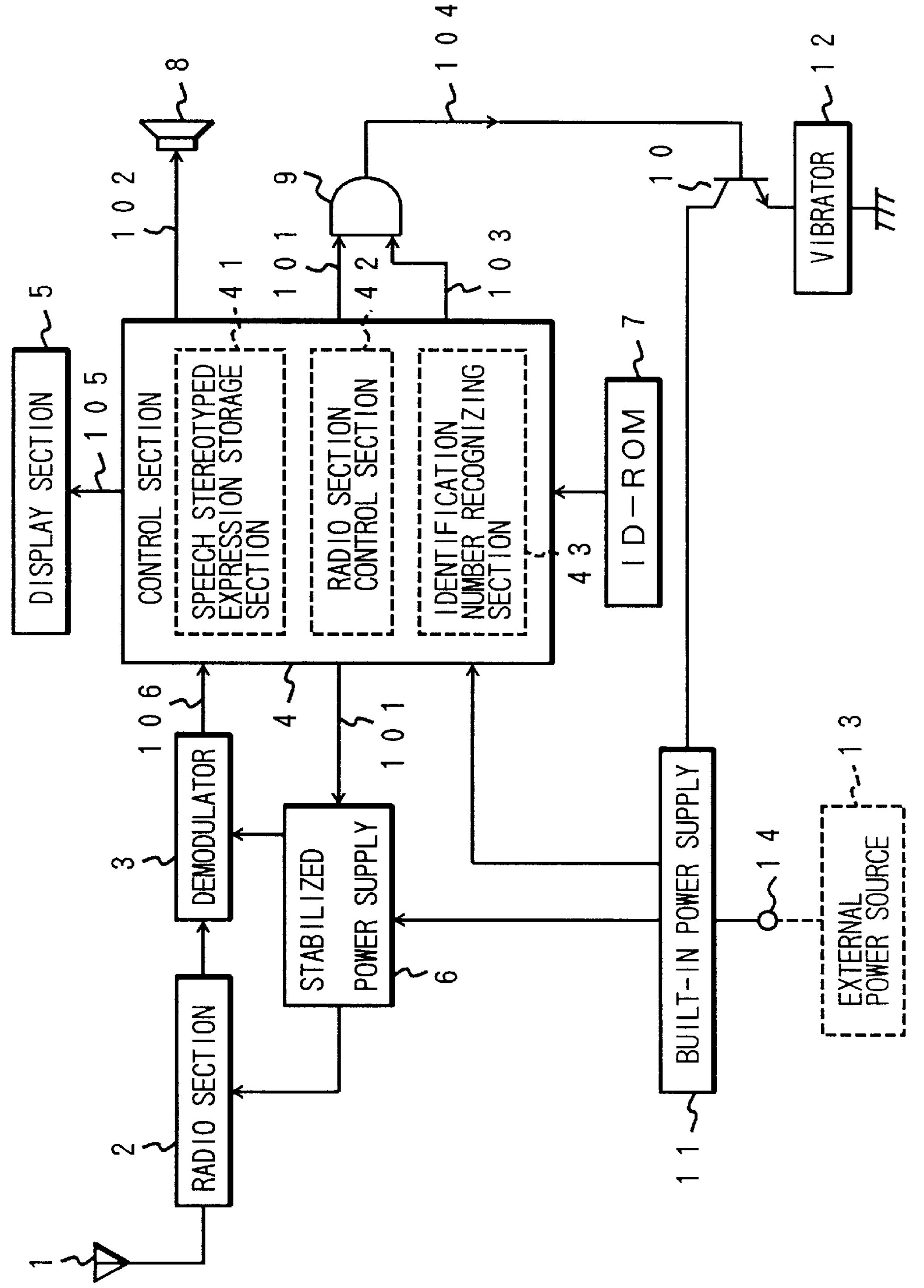
FIG. 1 is a block diagram showing the arrangement of an embodiment of the present invention.
Figure 2:
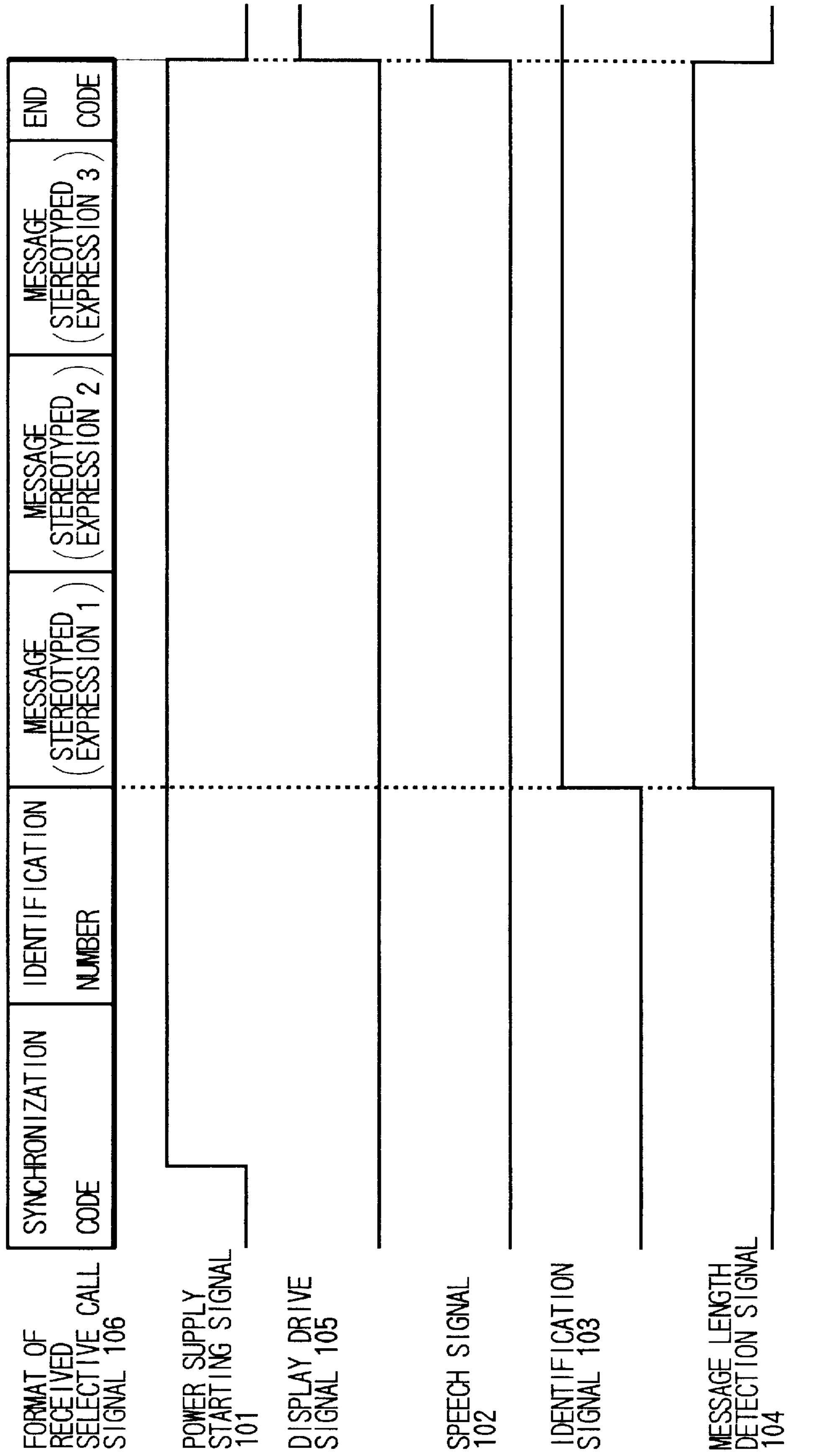
FIG. 2 is a timing chart showing a signal format and the waveforms of signals in the embodiment shown in FIG. 1.

FIG. 1 is a block diagram showing an embodiment of the present invention. FIG. 2 is a timing chart showing a signal format and the waveforms of signals in the embodiment shown in FIG. 1.

Referring to FIG. 1, when a radio selective calling receiver is started, battery saving is performed through a radio section control section 42 of a control section 4. When a power supply starting signal 101 is set at High level, a stabilized power supply 6 is started to supply power to a radio section 2 and a demodulator 3. At this time, a radio wave received by an antenna 1 is amplified and frequency-converted by the radio section 2 and demodulated into a signal waveform by the demodulator 3. The resultant signal is input as a received selective call signal 106 to the control section 4. FIG. 2 shows the format of this signal 106. When the synchronization code of the signal 106 is recognized, the radio section control section 42 keeps the signal 101 at High level.

In addition, if the identification number coincides with the self-identification number in an ID-ROM 7, an identification number recognizing section 43 of the control section 4 captures a message signal (stereotyped expressions 1, 2, and 3) succeeding the identification number. Upon reception of the end code, the signal 101 goes to Low level, and the supply of power to the radio section 2 and the demodulator 3 is stopped.

Subsequently, the user operates switches (not shown) to output a display drive signal 105 to display information on a display section 10, and output a speech signal 102 to cause a loudspeaker 8 to generate a sound, thereby notifying the reception of the message.

Before this operation, i.e., during the reception of stereotyped expressions 1, 2, and 3, the receiver body vibrates to notify the user of the time length of the stereotype messages as the speech information. This operation will be described below with reference to FIGS. 1 and 2.

In the control section 4, when the received selective call signal 106 is received, the power supply starting signal 101 is set at High level first in accordance with the synchronization code at the head of the signal. If the succeeding identification number coincides with the self-number, an identification signal 103 goes to High level. These two signals are input to an AND circuit 9 to set a message length detection signal 104, which is output from the AND circuit 9, at High level, thereby notifying the start of the stereotyped messages. A transistor 14 is turned on by this signal 104 to start a vibrator 12 so as to vibrate the receiver body. When the reception of the stereotyped messages is completed, and the end code is received, the signal 101 goes to Low level, and the signal 104 goes to Low level. As a result, the operation of the vibrator 12 is stopped, and the vibration is stopped.

Since this stereotyped messages are constituted by an abbreviated code signal, the vibration time, during which the receiver body vibrates to notify the length of the messages, is much shorter than the length of the messages to be actually output by speech, although the vibration time is proportional to the length of the messages. In addition, a long message can be partly output by speech. Since a stereotyped expression to be received and output by speed is temporarily stored in a speech stereotyped expression storage section 41 of the control section 4 and is output by speech upon a switching operation, the stereotyped expression can output again. In this receiver, power is supplied from a built-in power supply 11, which is a small-capacity battery, to the respective sections. If, however, a long message is received, an external power source 13 can be connected to an external terminal 14 to externally supply power to the respective sections.

What is claimed is:

1. A radio selective calling receiver for outputting a received message by speech through a loundspeaker upon reception of a radio selective call signal addressed to said receiver, comprising message length detection means for, when the radio selective call signal is received, detecting a time length of a message signal which is included in the call signal and is to be output by speech, and vibration generating means for vibrating a body of said radio selective calling receiver in accordance with an output signal from said message length detection means for an output time of duration equal to the time length of said received message.

2. A receiver according to claim 1, wherein the radio selective call signal uses a stereotyped code signal, which is an abbreviated code, as the message signal, said message length detection means detects a time length of the stereotyped code signal upon reception of the call signal, and said vibration means vibrates the body for a period of time corresponding to the detected time length.

3. A receiver according to claim 1, further comprising an external terminal to which an external power source can be easily connected in parallel with a built-in power supply.

4. A receiver according to claim 2, further comprising an external terminal to which an external power source can be easily connected in parallel with a built-in power supply.

* * * * *